US012347456B1

(12) United States Patent
Tomoda

(10) Patent No.: US 12,347,456 B1
(45) Date of Patent: Jul. 1, 2025

(54) METHOD AND MAGNETIC DISK APPARATUS

(71) Applicants: Kabushiki Kaisha Toshiba, Tokyo (JP); Toshiba Electronic Devices & Storage Corporation, Tokyo (JP)

(72) Inventor: Yusuke Tomoda, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/768,832

(22) Filed: Jul. 10, 2024

(30) Foreign Application Priority Data

Mar. 22, 2024 (JP) ................. 2024-046278

(51) Int. Cl.
| | |
|---|---|
| G11B 27/36 | (2006.01) |
| G11B 5/012 | (2006.01) |
| G11B 20/00 | (2006.01) |
| G11B 20/12 | (2006.01) |
| G11B 20/18 | (2006.01) |

(52) U.S. Cl.
CPC .......... *G11B 20/1889* (2013.01); *G11B 5/012* (2013.01); *G11B 20/1217* (2013.01); *G11B 2020/1232* (2013.01); *G11B 2220/2508* (2013.01)

(58) Field of Classification Search
CPC ......... G11B 27/36; G11B 20/00; G11B 20/12; G11B 5/59627; G11B 20/18; G11B 2020/1813

USPC .......................................................... 360/48
See application file for complete search history.

(56) References Cited

U.S. PATENT DOCUMENTS

| | | |
|---|---|---|
| 8,908,310 B1 | 12/2014 | Bai et al. |
| 9,286,150 B2 | 3/2016 | Feldman |
| 2011/0170392 A1* | 7/2011 | Tsukada ............... G11B 27/002 369/53.41 |
| 2015/0179214 A1 | 6/2015 | Pantel |
| 2016/0012849 A1 | 1/2016 | Feldman |

FOREIGN PATENT DOCUMENTS

JP 2011-134385 A 7/2011

\* cited by examiner

*Primary Examiner* — Nabil Z Hindi
(74) *Attorney, Agent, or Firm* — Kim & Stewart LLP

(57) ABSTRACT

A method according to one embodiment includes acquiring a result of quality inspection related to recording quality of first sectors included in a first storage area of a magnetic disk. The method includes calculating a first number being the number of sectors corresponding to a capacity obtained by subtracting a set capacity from an actual capacity of the first storage area. The first number is calculated based on the set capacity of the first storage area and a set value of recording density of the first storage area. The method includes selecting a second number of sectors from the first sectors based on the result of quality inspection. The method includes assigning addresses to a group of sectors that are not included in the second number of sectors among the first sectors. The group of sectors consists of sectors with the number corresponding to the set capacity.

19 Claims, 12 Drawing Sheets

RADIAL DIRECTION

ORDER OF WRITE
(SMR DIRECTION)

METHOD AND MAGNETIC DISK APPARATUS

CROSS-REFERENCE TO RELATED APPLICATIONS

This application is based upon and claims the benefit of priority from Japanese Patent Application No. 2024-046278, filed on Mar. 22, 2024; the entire contents of which are incorporated herein by reference.

FIELD

Embodiments described herein relate generally to a method and a magnetic disk apparatus.

BACKGROUND

For magnetic disk apparatuses, a recording scheme that is called shingled magnetic recording (SMR) is conventionally known. According to the SMR, a track pitch can be made narrower than a width of a write head, which makes it possible to improve the recording density.

DETAILED DESCRIPTION

According to one embodiment, a method includes acquiring, calculating, selecting, and assigning. The acquiring is performed by acquiring a result of quality inspection related to recording quality of first multiple sectors included in a first storage area of a magnetic disk provided in a magnetic disk apparatus. The first storage area includes first multiple tracks to which data is written by a shingled magnetic recording (SMR) scheme. The first multiple tracks each include different sectors out of the first multiple sectors. The calculating is performed by calculating a first number based on a set capacity of the first storage area and a set value of recording density of the first storage area, the first number being a number of sectors corresponding to a capacity obtained by subtracting the set capacity from an actual capacity of the first storage area. The selecting is performed by selecting, based on the result of quality inspection, a second number of sectors from among the first multiple sectors. The second number is a number larger than zero and equal to or smaller than the first number. The assigning is performed by assigning addresses to a group of sectors not included in the second number of sectors among the first multiple sectors. The addresses are usable by a host connected to the magnetic disk apparatus. The group of sectors consists of sectors with a number corresponding to the set capacity.

Hereinafter, a method and a magnetic disk apparatus according to embodiments will be described in detail with reference to the attached drawings. Note that the present disclosure is not limited to those embodiments.

First Embodiment

Figure 1:
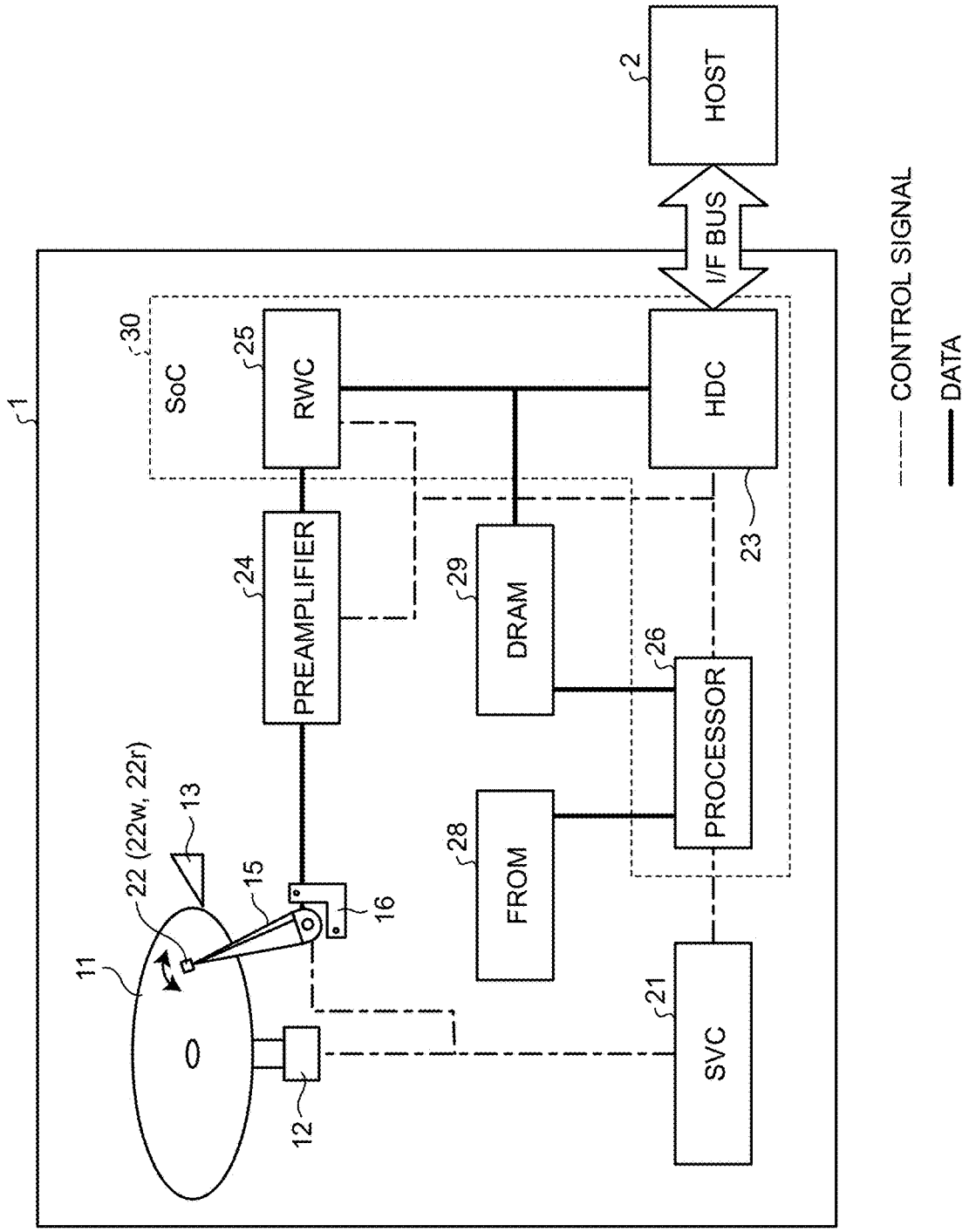
FIG. 1 is a diagram illustrating an example of a configuration of a magnetic disk apparatus of a first embodiment.

FIG. 1 is a diagram illustrating an example of a configuration of a magnetic disk apparatus 1 of a first embodiment.

The magnetic disk apparatus 1 is connected to a host 2. The magnetic disk apparatus 1 can receive access commands from the host 2. The access commands include a write command and a read command.

The magnetic disk apparatus 1 includes a magnetic disk 11 on which a magnetic layer is formed. The magnetic disk apparatus 1 accesses the magnetic disk 11 in response to the access command. The access includes write of data and read of data. The access command includes an address indicating a position in a logical address space that is provided to the host 2 by the magnetic disk apparatus 1. The host 2 designates a position of an access destination by the address included in the access command. In one example, the address is a logical block address (LBA). Hereinafter, description is given by assuming that the address is the LBA.

Write and read of data are performed by using a magnetic head 22. In addition to the magnetic disk 11, the magnetic disk apparatus 1 includes a spindle motor (SPM) 12, a ramp 13, an actuator arm 15, a voice coil motor (VCM) 16, a servo controller (SVC) 21, the magnetic head 22, a hard disk controller (HDC) 23, a preamplifier 24, a read/write channel (RWC) 25, a processor 26, a flash read only memory (FROM) 28, and a dynamic random access memory (DRAM) 29.

The magnetic disk 11 is rotated at a predetermined rotational speed by the coaxially attached SPM 12.

One magnetic disk 11 is illustrated in FIG. 1, whereas the magnetic disk apparatus 1 may include multiple magnetic disks 11. In a case where the magnetic disk apparatus 1 includes the multiple magnetic disks 11, the multiple magnetic disks 11 are integrally rotated by the SPM 12. In addition, the magnetic head 22 is provided for each of recording surfaces of the multiple magnetic disks 11.

The SVC 21 is an integrated circuit implementing a function as a driver that drives the SPM 12 and the VCM 16.

The processor 26 controls, via the SVC 21, the rotation of the SPM 12 and the rotation of the VCM 16.

The magnetic head 22 performs write and read to and from the magnetic disk 11 by using a write head 22w and a read head 22r provided in the magnetic head 22. In addition, the magnetic head 22 is attached to a distal end of the actuator arm 15. The magnetic head 22 is moved in the radial direction of the magnetic disk 11 by the VCM 16 driven by the SVC 21. Note that one or both of the write head 22w and the read head 22r included in the magnetic head 22 may be plurally provided in one magnetic head 22.

When the rotation of the magnetic disk 11 is stopped or the like, the magnetic head 22 is moved onto the ramp 13. The ramp 13 is configured to hold the magnetic head 22 at a position separated from the magnetic disk 11.

The preamplifier 24 is an integrated circuit that performs write and read of data through the magnetic head 22. The preamplifier 24 amplifies a signal read by the magnetic head 22 from the magnetic disk 11 and outputs the amplified signal to be supplied to the RWC 25 during a read operation. In addition, the preamplifier 24 amplifies a signal corresponding to write target data supplied from the RWC 25 and supplies the amplified signal to the magnetic head 22 during a write operation.

The HDC 23 performs control of transmission and reception of data to and from the host 2 via an I/F bus, control of the DRAM 29, etc.

The DRAM 29 is used as a buffer of data to be transmitted to and received from the host 2. For example, the DRAM 29 is used for temporarily storing write target data or data read from the magnetic disk 11.

In addition, the DRAM 29 is used as an operation memory by the processor 26. The DRAM 29 is used as an area into which a firmware program is loaded. In addition, the DRAM 29 is used as a buffer for data transfer between the host 2 and the magnetic disk 11.

The RWC 25 modulates write target data supplied from the HDC 23 and supplies the modulated data to the preamplifier 24. In addition, the RWC 25 performs demodulation including error correction on a signal, which has been read from the magnetic disk 11 and supplied from the preamplifier 24, and then outputs the signal to the HDC 23 as digital data.

The processor 26 is, for example, a central processing unit (CPU). The FROM 28 and the DRAM 29 are connected to the processor 26.

The FROM 28 stores the firmware program, various types of setting information, etc. Note that the firmware program may be stored on the magnetic disk 11.

In addition, the processor 26 performs overall control of the magnetic disk apparatus 1 in accordance with the firmware program stored in the FROM 28 or the magnetic disk 11. For example, the processor 26 loads the firmware program from the FROM 28 or the magnetic disk 11 into the DRAM 29, and executes control of the SVC 21, the preamplifier 24, the RWC 25, the HDC 23, and the like, in accordance with the firmware program loaded into the DRAM 29.

Note that part of or all the functions of the processor 26 may be implemented by a hardware circuit such as a field-programmable gate array (FPGA) or an application specific integrated circuit (ASIC).

The HDC 23, the RWC 25, and the processor 26 are configured as a system-on-a-chip (SoC) 30 that is one integrated circuit. In addition to these, the SoC 30 may include other elements (for example, the FROM 28, the DRAM 29, etc.). Note that the SoC 30 is an example of a controller.

Figure 2:
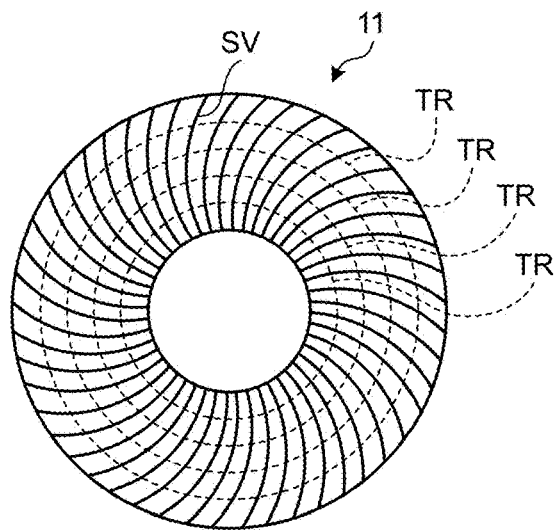
FIG. 2 is a view illustrating an example of a configuration of a magnetic disk according to the first embodiment.

FIG. 2 is a view illustrating an example of a configuration of the magnetic disk 11 according to the first embodiment. Servo information is written to a magnetic layer formed on a surface of the magnetic disk 11 by a servo writer or the like. The servo information may be written on the magnetic disk 11 by self-servo write (SSW). The servo information includes sector/cylinder information, a burst pattern, and a post code. The SoC 30 reads the servo information by using the magnetic head 22 and executes a positioning operation based on the read servo information.

In FIG. 2, servo areas SV arranged radially are illustrated as one example of the arrangement of servo areas where the servo information is written. In the radial direction of the magnetic disk 11, multiple concentric tracks TR are provided at a predetermined pitch. Multiple sectors are continuously formed on each of the tracks TR. Write and read of data are executed for each sector by the magnetic head 22.

As a recording scheme that is a scheme of writing data to the magnetic disk 11, there are several types of recording schemes. The recording schemes include shingled magnetic recording (SMR) and conventional magnetic recording (CMR).

Figure 3:
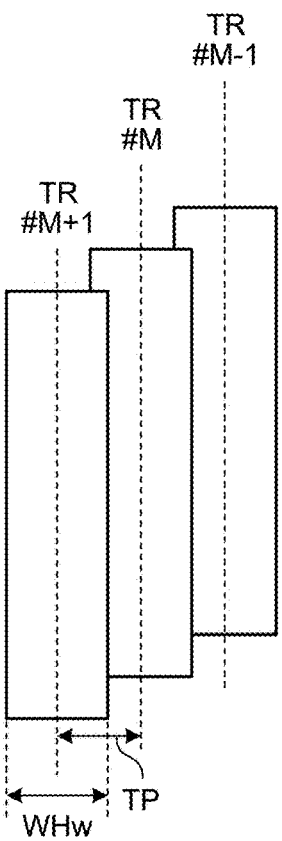
FIG. 3 is a view for describing SMR of the first embodiment.

FIG. 3 is a view for describing SMR of the first embodiment. In the SMR, write of data (referred to as first data) to a first track TR is executed, and, thereafter, write of data (referred to as second data) to a second track TR adjacent to the first track TR in the radial direction is executed. During the write of the second data, the second data is written so as to overlap with part of the first data. In other words, according to the SMR, data for one of two tracks TR adjacent to each other in the radial direction of the magnetic disk 11 is written so as to overlap with part of data for the other one of the two tracks TR.

As one example of three tracks TR, a track TR #M−1, a track TR #M, and a track TR #M+1 are illustrated in FIG. 3. The track TR #M−1 and the track TR #M are adjacent to each other. The track TR #M and the track TR #M+1 are adjacent to each other. In this example, data of the track TR #M−1, data of the track TR #M, and data of the track TR #M+1 are written in this order. The data of the track TR #M is written so as to partially overlap with the data of the track TR #M−1 in the radial direction. The data of the track TR #M+1 is written so as to partially overlap with the data of the track TR #M in the radial direction. According to the SMR, the overlapping of data of one track TR with part of data of an adjacent track TR to which data has already been written is repeated.

According to the SMR, data is written by the above-described method, so that a track pitch TP is made narrower than an element width (WHw) of the write head 22w of the magnetic head 22. As a result, the recording density can be set to be high.

However, according to the SMR, it is susceptible to adjacent track erasure (ATE) due to the narrow track pitch TP. Thus, in principle, pieces of data corresponding to multiple tracks TR that are continuously arranged in the radial direction are collectively updated. An area in which the multiple tracks TR to be collectively updated are provided is referred to as a band area. The term "updated" can be rephrased as "changed" or "rewritten".

In addition, according to the SMR, data of one track TR is written so as to overlap with part of data of an adjacent track TR to which the data has already been written. Therefore, writing to multiple continuous tracks TR can be performed only in a direction of the inner side to the outer side or a direction of the outer side to the inner side. Such a radial orientation corresponding to the order of write with respect to the multiple tracks TR continuous in the radial direction is referred to as an SMR direction. The SMR direction may be common to all band areas, or may be determined for each band area. Hereinafter, as one example, it is assumed that the SMR direction is common to all band areas.

Figure 4:
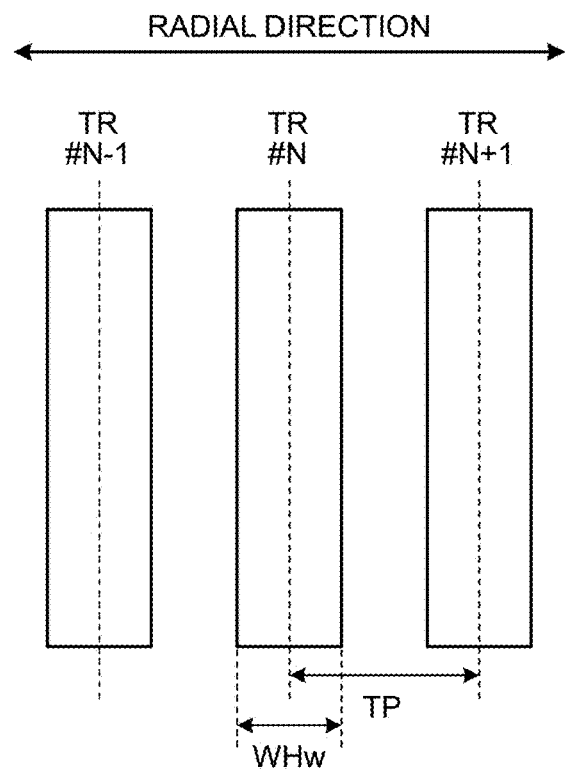
FIG. 4 is a view for describing CMR of the first embodiment.

FIG. 4 is a diagram for describing CMR of the first embodiment. As illustrated in FIG. 4, according to the CMR, data of each track TR is arranged so as not to overlap with data of adjacent tracks TR in the radial direction. In other words, the CMR is a scheme that pieces of data of two tracks TR adjacent to each other in the radial direction of the magnetic disk 11 are written so as not to overlap with each other.

For example, a track TR #N−1, a track TR #N, and a track TR #N+1 are depicted in FIG. 4 as three tracks TR. The track TR #N−1 and the track TR #N are arranged to be separated from each other in the radial direction. The track TR #N and the track TR #N+1 are arranged to be separated from each other in the radial direction. Accordingly, the track TR #N−1, the track TR #N, and the track TR #N+1 are arranged such that pieces of data of two adjacent tracks TR do not overlap with each other.

According to the CMR, the track pitch TP is the same as or larger than the element width (WHw) of the write head 22w, and thus, data at any position can be updated. Thus, the CMR enables performance of random access to be enhanced.

Figure 5:
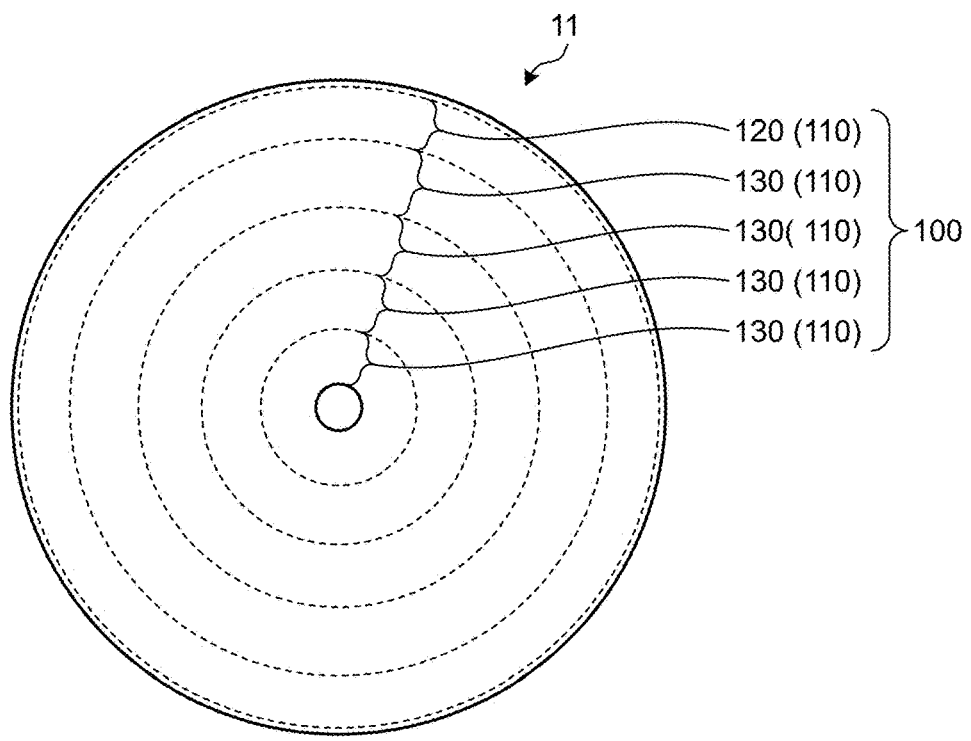
FIG. 5 is a view illustrating an example of multiple band areas provided in the magnetic disk of the first embodiment.
Figure 6:
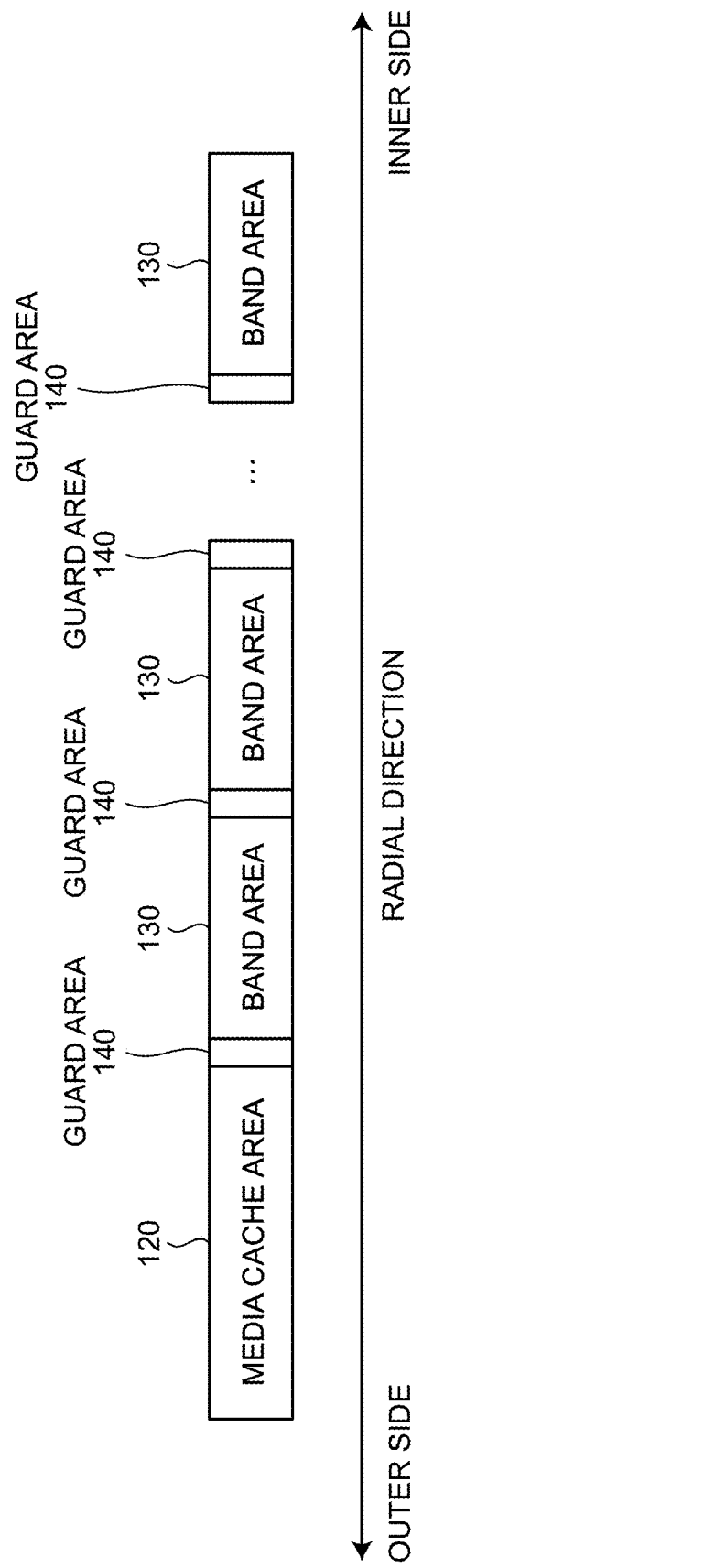
FIG. 6 is another view illustrating the example of the multiple band areas provided in the magnetic disk of the first embodiment.

FIGS. 5 and 6 are views illustrating an example of multiple band areas provided in the magnetic disk 11 of the first embodiment.

A recording surface 100 of the magnetic disk 11 that is an area where the tracks TR can be arranged, is divided into multiple storage areas 110 in the radial direction. The multiple storage areas 110 include one media cache area 120 and multiple band areas 130. An area called a guard area 140 where write is prohibited is provided between the storage areas 110. Each of the guard areas 140 consists of, for example, one or more tracks TR.

The storage area 110 on the outermost side in the radial direction in the recording surface 100 is set as the media cache area 120. The media cache area 120 is a storage area used as a place where data is temporarily stored. In the media cache area 120, data may be written by the CMR. Note that a position of the media cache area 120 is not limited to the outermost side of the recording surface 100. In addition, two or more media cache areas 120 may be provided on the recording surface 100.

Two or more of the multiple storage areas 110 are set as the band areas 130. Each of the band areas 130 is provided with multiple tracks TR. In each of the band areas 130, data is written by the SMR scheme to all the tracks TR. When data is written to a band area 130 as write destination, it is prohibited to write data to another band area 130 adjacent to the band area 130 as write destination beyond the guard area 140.

An LBA is mapped to each of the band areas 130. Thus, each of the band areas 130 is a final storage position of data to be written (referred to as write data) requested by the host 2.

As described above, data stored in each of the band areas 130 is updated in a unit of the band area 130. In one example, the write data transmitted from the host 2 is temporarily buffered in the DRAM 29. The entire data (referred to as band data) in the band area 130 as the final storage position of the write data buffered in the DRAM 29 is transferred to, for example, the media cache area 120. Then, on the media cache area 120, the band data is updated by using the write data buffered in the DRAM 29. The updated band data is overwritten to the band area 130. Note that an updating method in the unit of the band area 130 is not limited thereto.

Figure 7:
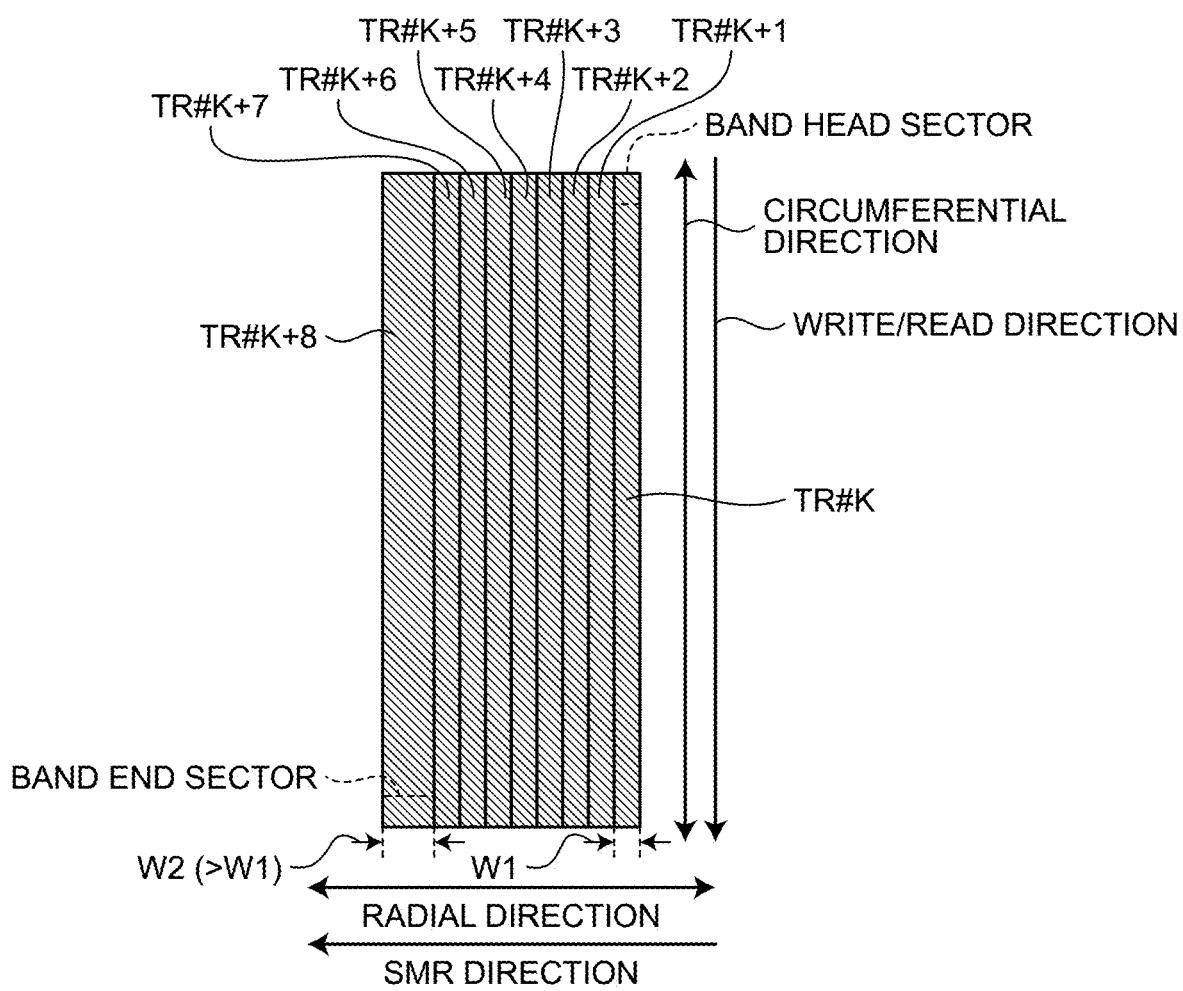
FIG. 7 is a view illustrating an example of setting of tracks in each band area of the first embodiment.

FIG. 7 is a view illustrating an example of setting of the tracks TR in each of the band areas 130 of the first embodiment.

In the example illustrated in FIG. 7, the band area 130 includes nine tracks TR, namely, tracks TR #K to TR #(K+8). In the SMR direction set in this band area 130, data is first written to the track TR #K. After the track TR #K, data is sequentially written to the track TR #(K+1), the track TR #(K+2), the track TR #(K+3), the track TR #(K+4), the track TR #(K+5), the track TR #(K+6), and the track TR #(K+7). Then, data is finally written to the track TR #(K+8).

A track TR to which data is first written for the band area 130, such as the track TR #K, is referred to as a head track TR. A track TR to which data is finally written for the band area 130, such as the track TR #(K+8), is referred to as an end track TR.

Note that the head track can be considered as a track TR closest to one of two ends of one band area 130 in the radial direction, and the end track can be considered as a track TR closest to the other one of the two ends of the one band area 130 in the radial direction.

According to the SMR, data of one track TR is written so as to overlap with part of data of an adjacent track TR, which has already been written. Thus, a track width W1 of each of all the tracks TR except the track TR #(K+8), namely, each of the tracks TR #K to TR #(K+7) is narrower than the element width WHw of the write head 22w. On the other hand, the track TR #(K+8) is the track TR to which write is finally executed for the band area 130, and a track width W2 of the track TR #(K+8) is equal to the element width WHw of the write head 22w. Thus, the track width W2 of the track TR #(K+8) is wider than the track width W1 of each of the tracks TR #K to TR #(K+7). The recording performance of magnetic heads 22 are uneven due to manufacturing variation. Also, on the recording surface 100 of the magnetic disk 11, data holding capability is uneven. Therefore, the recording surface 100 is segmented into multiple zones in the radial direction, and the recording density is set for each combination of a zone and the magnetic head 22. The recording density of the magnetic disk 11 is defined by a track per inch (TPI) and a bit per inch (BPI). The TPI represents the arrangement density of tracks TR, and the BPI represents the recording density along a track TR.

As the TPI increases, the track width W gets narrower, and the recording quality deteriorates. Moreover, the recording quality deteriorates as the BPI increases. The TPI and the BPI are set such that the recording density is as high as possible under a constraint that the recording quality is maintained at a predetermined level or higher.

Each of the band areas 130 is included in any zone. In the band area 130 illustrated in FIG. 7, the track width W1 is determined in accordance with the TPI that is set in a zone including this band area 130. However, the track width W2 of the track TR #(K+8), which is the end track TR, is wider than the track width W1 of each of the tracks TR #K to TR #(K+7). Therefore, the recording quality of the track TR #(K+8) is higher than the recording quality of each of the tracks TR #K to TR #(K+7).

In FIG. 7, a write/read direction is illustrated. The write/read direction is a direction in which data is written or read to or from each track TR. The magnetic head 22 moves relatively to the magnetic disk 11 by the rotation of the magnetic disk 11. Therefore, the write/read direction is opposite to a rotation direction of the magnetic disk 11.

In one track TR, write/read in units of sectors is executed in the write/read direction. Therefore, a band head sector that is a sector whose order of write is the first in the band area 130 and a band end sector that is a sector whose order of write is the last in the band area 130 are determined. The band head sector is included in the track TR #K which is the head track TR. The band end sector is included in the track TR #(K+8) which is the end track TR.

In general, a storage capacity of each of the band areas 130 is set based on specifications required by a customer. In manufacturing of the magnetic disk apparatus 1, each of the band areas 130 is set such that the storage capacity of each of the band areas 130 becomes a set value (hereinafter, a set capacity) based on the specification required by the customer. In practice, the respective band areas 130 are set in units of tracks TR, and thus, an actual storage capacity (hereinafter, an actual capacity) of each of the band areas 130 may be slightly larger than the set capacity.

Figure 8:
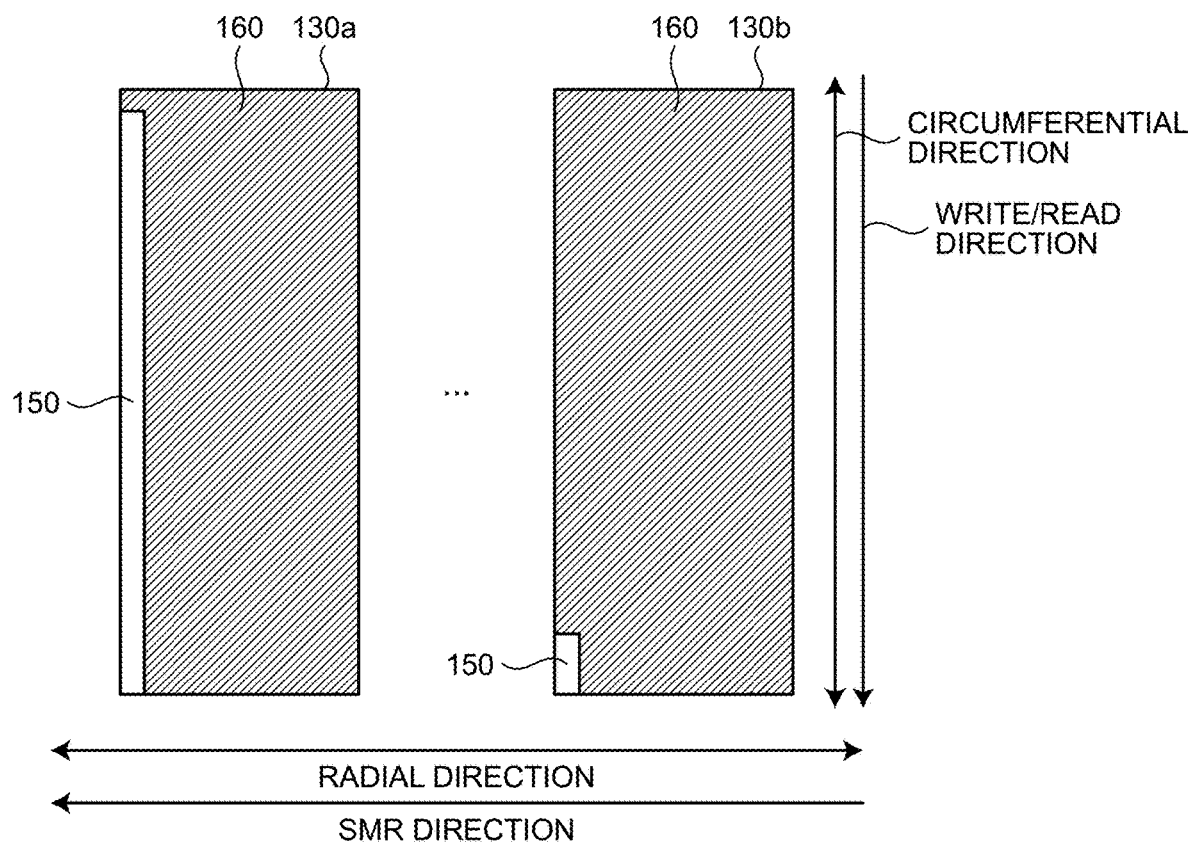
FIG. 8 is a view for describing an example of a relationship between an actual capacity and a set capacity of the band area of the first embodiment.

FIG. 8 is a view for describing an example of a relationship between the actual capacity and the set capacity of the band area 130 of the first embodiment.

In FIG. 8, a band area 130a and a band area 130b arranged at different positions in the radial direction. A hatched area 160 of each of the band area 130a and the band area 130b indicates a group of sectors in which data is written when the data corresponding to the set capacity is written from the band head sector of each of the band areas 130 without any gap. An area 150 is a group of surplus sectors that occurs in the end track TR. The number of the surplus sectors corresponds to a capacity obtained by subtracting the set capacity from the actual capacity of the band area 130. The area 150 is referred to as a surplus sector group 150. In addition, each sector constituting the surplus sector group 150 is referred to as a surplus sector.

The recording density (that is, the pair of TPI and BPI) of the band area 130 may be different for each zone. Thus, a size of the surplus sector group 150 (the number of surplus sectors of this group 150) may be different for each of the band areas 130. In the example illustrated in FIG. 8, the number of surplus sectors in the band area 130a is larger than the number of surplus sectors in the band area 130b.

In general, the recording quality in one band area 130 is not uniform in all sectors, and may locally vary due to various factors. In addition, the end track TR has the wider track width W than that of the other tracks TR as described above. Therefore, the end track TR has recording quality higher than that of sectors of the other tracks TR.

Considering the above, in the first embodiment, the magnetic disk apparatus 1 prohibits the use of a sector having low recording quality. The magnetic disk apparatus 1 assigns an LBA to a surplus sector of the end track TR instead of assigning an LBA to a sector having low recording quality so that the sector having high recording quality of the end track TR can be used instead of the sector having low recording quality. As a result, the recording quality of the band area 130 as a whole is improved.

Figure 9:
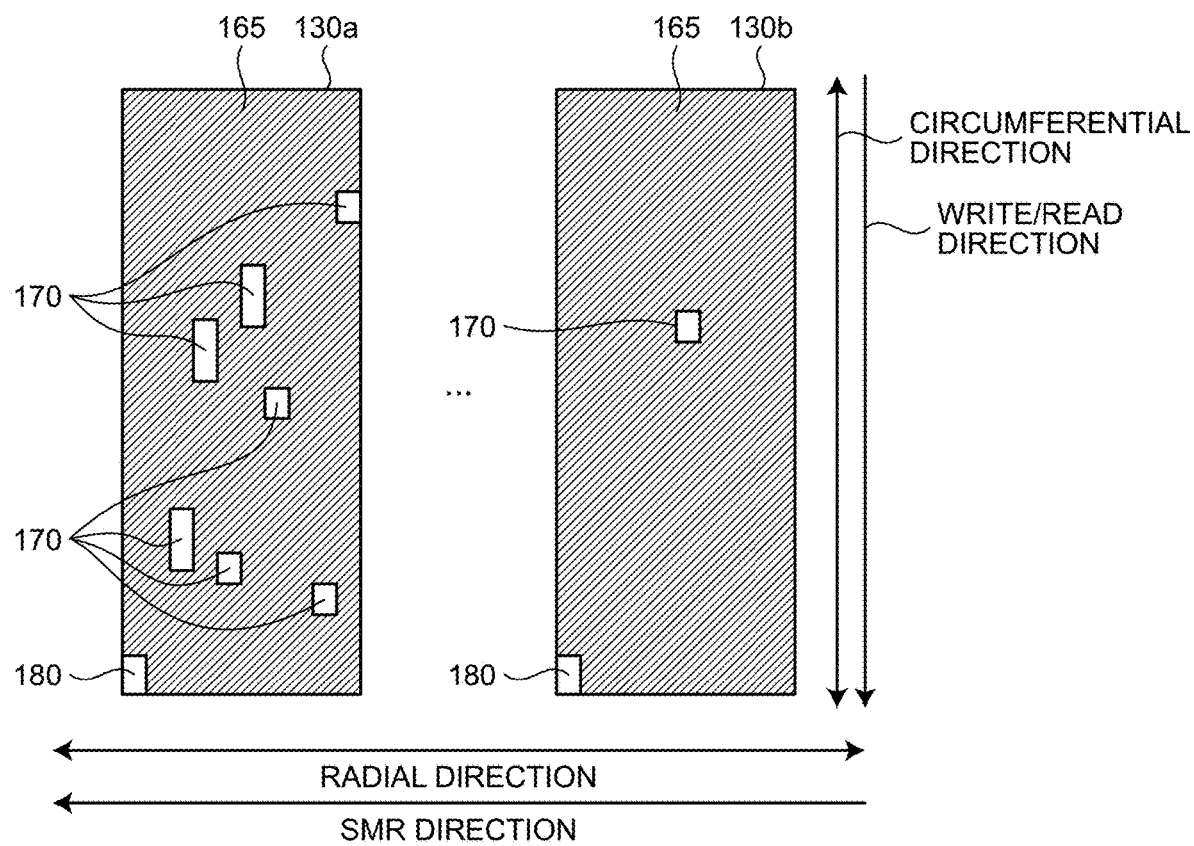
FIG. 9 is a view for describing an area to which an LBA is assigned by the magnetic disk apparatus of the first embodiment.

FIG. 9 is a view for describing an area to which an LBA is assigned by the magnetic disk apparatus 1 of the first embodiment. In this drawing, a hatched area 165 is an area where sectors assigned with LBAs are located. Blank areas 170 and 180 indicate groups of sectors not assigned with LBAs.

In the band area 130a, an LBA is not assigned to the areas 170 each including sectors having low recording quality. Instead, among the surplus sectors constituting the surplus sector group 150 of the band area 130a illustrated in FIG. 8, the LBA is assigned to all sectors except a spare sector group 180 constituted by a predetermined number of spare sectors on the band end sector side illustrated in FIG. 9.

Similarly, in the band area 130b, an LBA is not assigned to the area 170 including sectors having low recording quality. Instead, among the surplus sectors constituting the surplus sector group 150 of the band area 130b illustrated in FIG. 8, the LBA is assigned to all sectors except the spare sector group 180 constituted by the predetermined number of spare sectors on the band end sector side illustrated in FIG. 9.

Note that the spare sector group 180 constituted by the predetermined number of spare sectors is provided on the band end sector side in each of the band areas 130. A spare sector is a sector prepared for occurrence of a sector that is difficult to use in the band area 130 after shipment.

In a case where, after shipment, a sector that is difficult to use is found from among sectors assigned with LBAs, the SoC 30 uses a spare sector included in the same band area 130 instead of the sector that is difficult to use. Specifically, in one example, when a write operation for a sector (referred to as a first sector) assigned with a LBA fails continuously a predetermined number of times, the SoC 30 registers the first sector as a use-prohibited sector. Then, the SoC 30 does not perform the write operation on the first sector, and instead resumes the write operation from a sector next to the first sector. The set capacity of the band area 130 is fixed. Therefore, in response to registering the first sector as the use-prohibited sector, an LBA is assigned to another spare sector (referred to as a second sector) in the spare sector group 180, and the second sector is used as a data storage destination.

Note that the spare sector group 180 is assumed to be provided in the band area 130, but the spare sector group 180 is not necessarily provided in the band area 130. In a case where the spare sector group 180 is not provided in the band area 130, LBAs can be assigned to all the sectors of the end track TR of the band area 130.

In this manner, zero or more spare sectors are provided in each of the band areas 130. Thus, assuming that the number of surplus sectors included in the surplus sector group 150 is a first number, an LBA is assigned to a second number of surplus sectors, which is larger than zero and equal to or smaller than the first number, out of the first number of surplus sectors, instead of the sector having low recording quality.

Recording quality inspection (hereinafter, quality inspection) is executed by, for example, an inspection apparatus.

Figure 10:
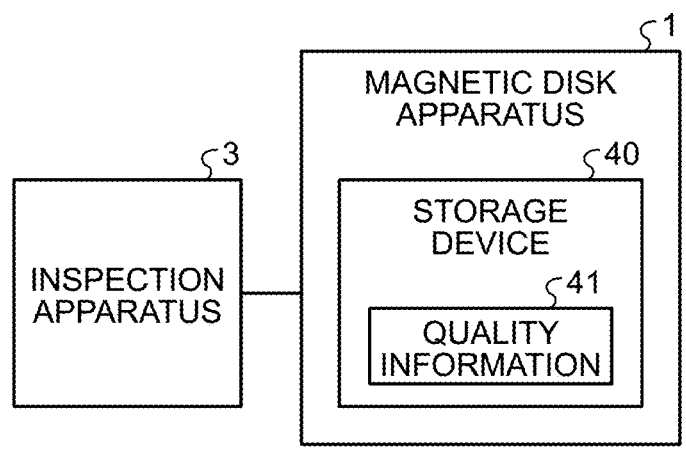
FIG. 10 is a diagram for describing an inspection apparatus of the first embodiment.

FIG. 10 is a diagram for describing an inspection apparatus 3 of the first embodiment.

The magnetic disk apparatus 1 is connected to the inspection apparatus 3. The inspection apparatus 3 can have the same configuration as that of a normal computer including, for example, a processor and a storage device. The processor of the inspection apparatus 3 inspects the recording quality of all sectors provided in the magnetic disk 11 with respect to the magnetic disk apparatus 1 connected thereto. The processor of the inspection apparatus 3 generates quality information 41 in which a result of recording quality inspection is recorded, and stores the generated quality information 41 in the storage device 40 included in the magnetic disk apparatus 1. The storage device 40 is not limited to a specific storage device. The storage device 40 may be, for example, the FROM 28 or the magnetic disk 11.

Note that, in the example illustrated in FIG. 10, one magnetic disk apparatus 1 is connected to the inspection apparatus 3. Alternatively, two or more magnetic disk apparatuses 1 may be connected to the inspection apparatus 3. The inspection apparatus 3 may be configured to execute inspection on the two or more magnetic disk apparatuses 1 in parallel.

Figure 11:
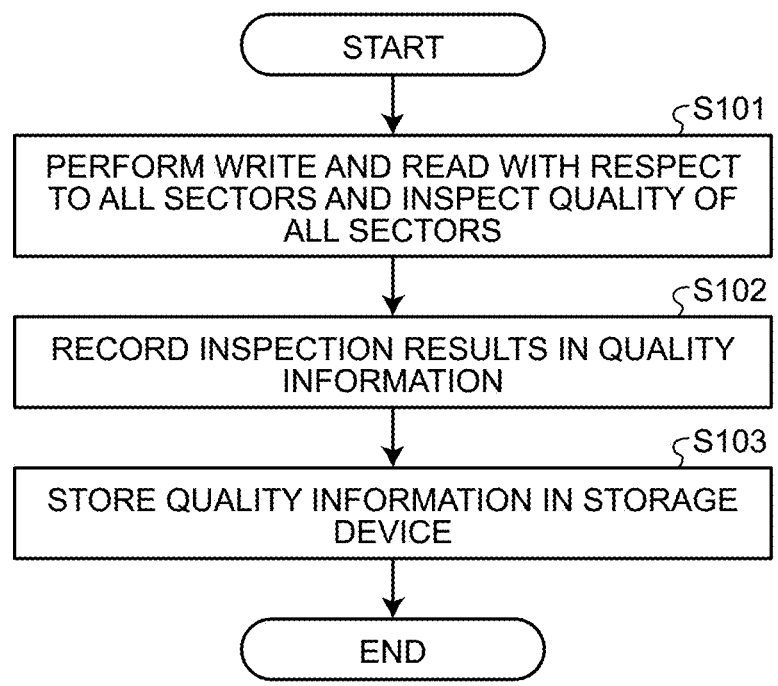
FIG. 11 is a flowchart illustrating an example of an operation of quality inspection performed by the inspection apparatus of the first embodiment.

FIG. 11 is a flowchart illustrating an example of an operation of quality inspection performed by the inspection apparatus 3 of the first embodiment.

The processor of the inspection apparatus 3 inspects quality of all sectors by performing write of data to all the sectors and read of data from all the sectors with respect to the magnetic disk apparatus 1 connected to the inspection apparatus 3 (S101).

Specifically, for example, the processor of the inspection apparatus 3 calculates the number of errors included in the read data for each sector by comparing write data transmitted to the magnetic disk apparatus 1 with read data received from the magnetic disk 11 for each sector. The number of errors included in the read data calculated for each sector is used as an index indicating the recording quality of each sector.

Note that a method of quality inspection on all sectors is not limited to the above method.

The processor of the inspection apparatus 3 records results of quality inspection on all the sectors in the quality information 41 (S102), and stores the quality information 41 in the storage device 40 of the magnetic disk apparatus 1 (S103). Then, the operation of quality inspection ends.

Note that a configuration of the quality information 41 is not limited to a specific configuration. The quality information 41 may have a configuration that an index indicating the recording quality is recorded for each sector. The index indicating the recording quality may be the number of errors included in the read data, or may be numerical information that can take multiple levels calculated based on the number of errors included in the read data.

Figure 12:
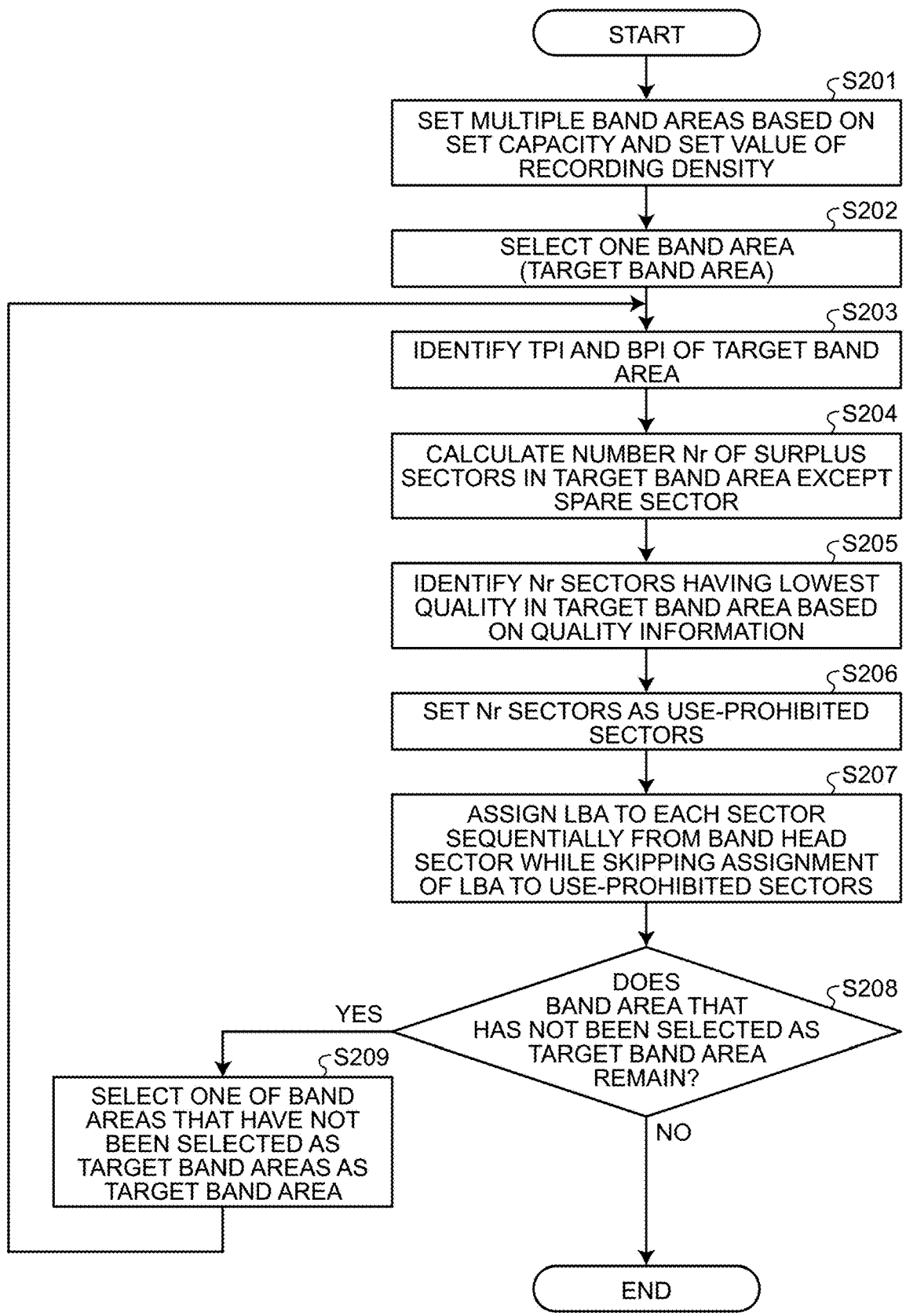
FIG. 12 is a flowchart illustrating an example of an operation of the magnetic disk apparatus of the first embodiment.

FIG. 12 is a flowchart illustrating an example of an operation of the magnetic disk apparatus 1 of the first embodiment.

The SoC 30 sets multiple band areas 130 on the magnetic disk 11 based on the set capacity (that is the set value of the storage capacity of each of the band areas 130) and the set value of the recording density (TPI and BPI) (S201). The SoC 30 calculates a capacity of each track TR based on the set value of the recording density. Then, the SoC 30 executes an operation of setting a bundle of multiple continuously arranged tracks TR as one band area 130 for all the band areas 130. At this time, the SoC 30 sets each of the band areas 130 such that a size of the surplus sector group 150 in each of the band areas 130 does not exceed a size of one track TR. Note that the size of the surplus sector group 150 is not necessarily equal to or smaller than the size of one track TR.

Subsequently, the SoC 30 selects one of the multiple band areas 130 (S202). The selected band area 130 is referred to as a target band area.

The SoC 30 identifies a TPI and a BPI of the target band area (S203), and calculates a number Nr of surplus sectors in the target band area except a sector set as a spare sector (S204). The number of all surplus sectors in the target band area is an example of the first number. The number Nr is an example of the second number.

The SoC 30 selects Nr sectors having the lowest quality in the target band area based on the quality information 41 (S205).

In processing of S205, the SoC 30 may select, from among multiple tracks TR included in the target band area, Nr sectors having the lowest quality among all sectors included in tracks TR from a head track TR to a track TR adjacent to an end track TR. This is because sectors included in the end track TR have higher recording quality than the recording quality indicated by a quality inspection result.

After the processing of S205, the SoC 30 sets the selected Nr sectors as use-prohibited sectors (S206).

Subsequently, the SoC 30 assigns an LBA to each sector sequentially from a band head sector (S207).

In the processing of S207, the SoC 30 assigns an LBA to each of sectors such that numerical values of the LBAs are in ascending order along arrangement of those sectors. However, the SoC 30 skips the assignment of the LBA to the use-prohibited sectors. Thus, the SoC 30 assigns the LBA to a group of sectors whose number corresponds to the set capacity and which is not included in the selected Nr sectors out of a group of sectors included in the band area 130. As a result, the LBAs are assigned to all the sectors except the use-prohibited sectors and the spare sector as described with reference to FIG. 9.

The SoC 30 determines whether or not the band area 130 that has not been selected as a target band area remains (S208).

When the band areas 130 that have not been selected as target band areas remain (S208: Yes), the SoC 30 selects one of those band areas 130 as a target band area (S209). Then, the control transitions to S203.

When the band area 130 that has not been selected as a target band area does not remain (S208: No), the SoC 30 ends the operation.

Note that a correspondence between each sector and an LBA is recorded in management information of a predetermined nonvolatile storage area (for example, the FROM 28) by the SoC 30. In a case where an access command is received from the host 2 after shipment, the SoC 30 can identify a sector corresponding to an LBA included in the access command based on the management information.

As described above, according to the first embodiment, the SoC 30 calculates the number Nr of surplus sectors corresponding to the capacity that is obtained by subtracting the set value of the recording density from the set capacity based on the set capacity of the band area 130 and the set value of the recording density of the band area 130 (see, for example, S204 in FIG. 12). The SoC 30 selects the Nr sectors based on the quality information 41 in which the quality inspection results are recorded (see, for example, S205 in FIG. 12). The SoC 30 assigns the LBA to the group of sectors whose number corresponds to the set capacity and which is not included in the selected Nr sectors out of the group of sectors included in the band area 130 (see, for example, S207 in FIG. 12).

Therefore, the recording quality in the band area 130 can be improved, and the recording quality of the magnetic disk apparatus 1 as a whole can also be improved.

In addition, in the first embodiment, the SoC 30 selects the Nr sectors having the lowest recording quality out of the group of sectors included in the band area 130 (see, for example, S205 in FIG. 12).

Since the sectors of the end track TR having good recording quality are used instead of the Nr sectors having the lowest recording quality out of the group of sectors included in the band area 130, the recording quality in the band area 130 is improved, and the recording quality of the magnetic disk apparatus 1 as a whole is improved.

Note that the SoC 30 does not necessarily select the Nr sectors having the lowest recording quality. The SoC 30 may be configured to select Nr sectors from among sectors whose recording quality does not satisfy a predetermined level.

In addition, as described above, the SoC 30 may select, from among the multiple tracks TR included in the band area 130, the Nr sectors having the lowest quality among all the sectors included in the tracks TR from the head track TR to the track TR adjacent to the end track TR.

Since the sectors of the end track TR having good recording quality are used instead of the Nr sectors having the lowest recording quality out of the group of sectors included in the band area 130, the recording quality in the band area 130 is improved, and the recording quality of the magnetic disk apparatus 1 as a whole is improved.

Second Embodiment

In the above-described first embodiment, the quality inspection is performed on all sectors included in the magnetic disk apparatus 1. Targets of the quality inspection are not limited to all the sectors. Any result of quality inspection may be used as long as being related to the recording quality of a sector included in the band area 130. In a second embodiment, variations of quality inspection will be described.

There is a case where unevenness occurs in circumferential distribution of the thickness of a magnetic layer in a step of forming the magnetic layer on a surface of the magnetic disk 11. In such a case, the recording quality deteriorates in an elongated area extending in the radial direction.

Considering the above, in the second embodiment, the inspection apparatus 3 performs quality inspection on multiple sectors included in at least one track TR (hereinafter, inspection track TR) out of multiple tracks TR provided in the magnetic disk 11. The SoC 30 of the magnetic disk apparatus 1 selects Nr sectors from the radially extending elongated area (hereinafter, partial area) including a sector having the lowest recording quality among the multiple sectors included in the inspection track TR.

Hereinafter, contents different from those of the first embodiment will be mainly described. The same matters as those in the first embodiment will be briefly described or not be described.

Figure 13:
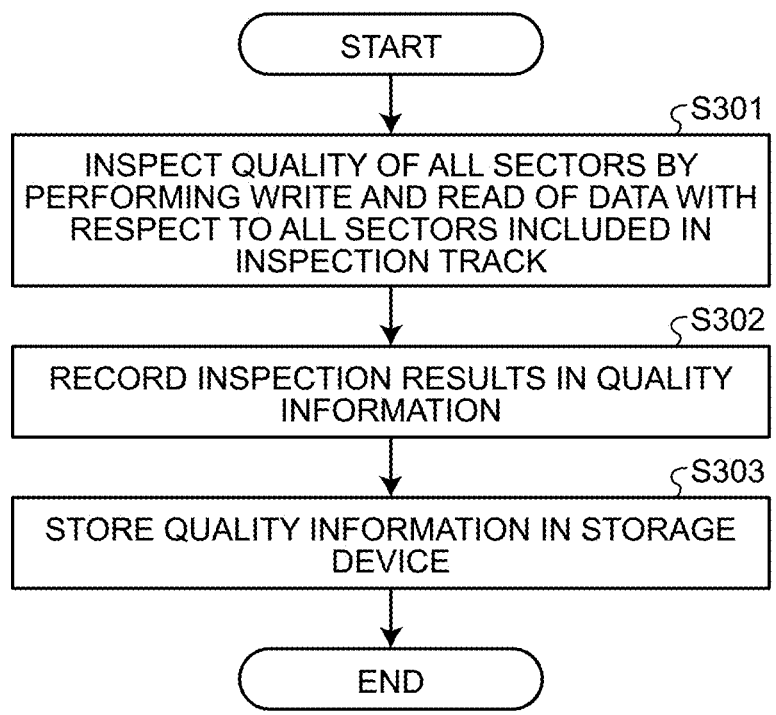
FIG. 13 is a flowchart illustrating an example of an operation of quality inspection performed by an inspection apparatus of a second embodiment.

FIG. 13 is a flowchart illustrating an example of an operation of quality inspection performed by the inspection apparatus 3 of the second embodiment.

A processor of the inspection apparatus 3 inspects the quality of all sectors included in the inspection track TR by performing write of data to all the sectors included in the inspection track TR and read of data from all the sectors with respect to the magnetic disk apparatus 1 connected to the inspection apparatus 3 (S301).

Note that at least one track TR of the multiple tracks TR provided on the recording surface 100 of the magnetic disk 11 is set as the inspection track TR.

The processor of the inspection apparatus 3 records a result of the quality inspection in the quality information 41 (S302), and stores the quality information 41 in the storage device 40 of the magnetic disk apparatus 1 (S303). Then, the operation of quality inspection ends.

Figure 14:
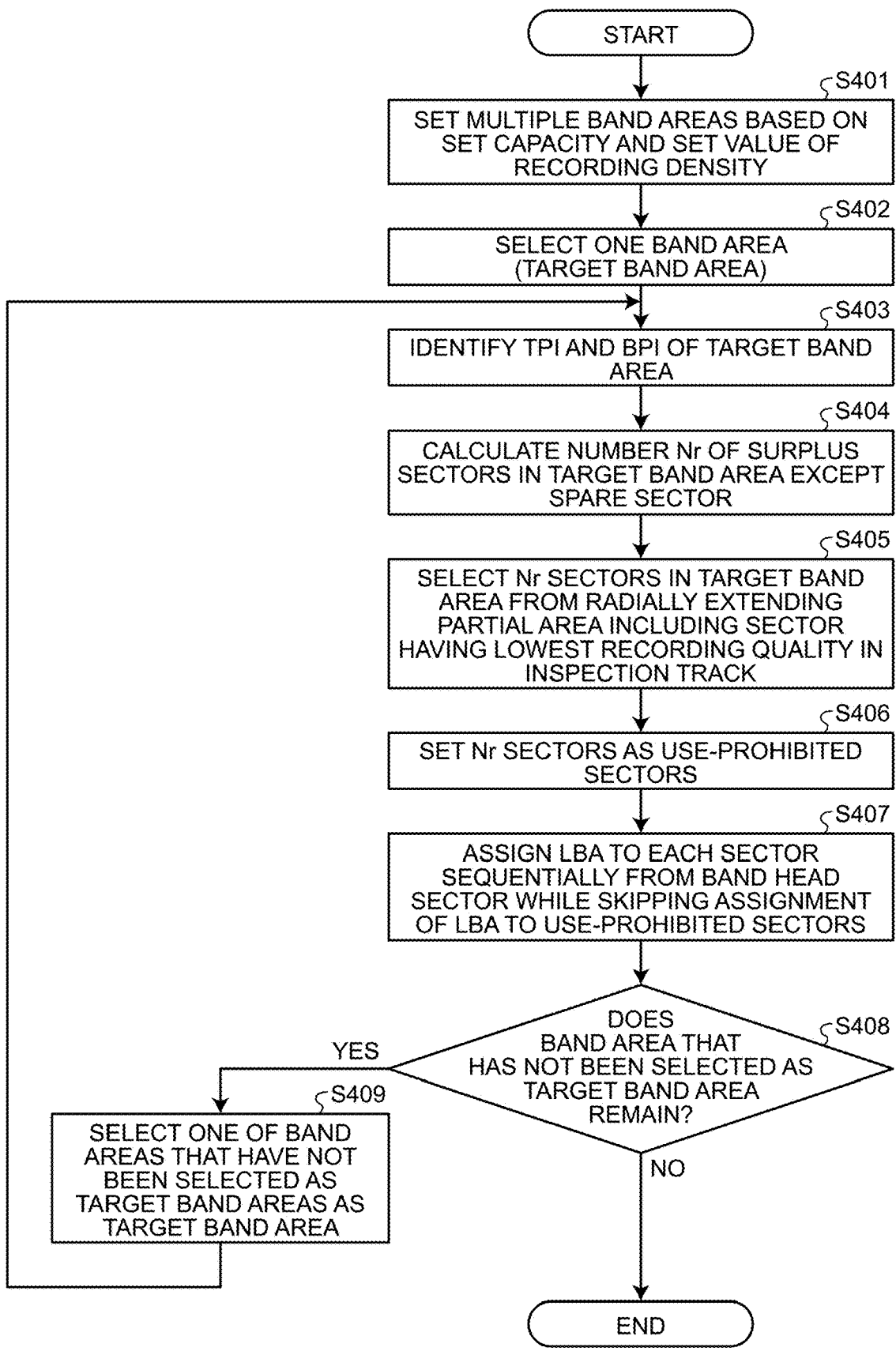
FIG. 14 is a flowchart illustrating an example of an operation of a magnetic disk apparatus of the second embodiment.

FIG. 14 is a flowchart illustrating an example of an operation of the magnetic disk apparatus 1 of the second embodiment.

The SoC 30 executes the same processing as that of S201 to S204 of FIG. 12 in S401 to S404.

In processing of S405, the SoC 30 selects Nr sectors located in a target band area from a partial area. As described above, the partial area is an elongated area that extends in the radial direction and includes a sector having the lowest recording quality in the inspection track TR. In one example, the partial area extends from the innermost end of the recording surface 100 to the outermost end of the recording surface 100.

Similarly to the processing of S205, the SoC 30 may select Nr sectors from among all sectors included in tracks TR from a head track TR to a track TR adjacent to an end track TR in the partial area. This is because sectors included in the end track TR have higher recording quality than the recording quality indicated by a quality inspection result.

After the processing of S405, the SoC 30 executes processing similar to that of S206 to S209 in S406 to S409, and ends the operation.

Figure 15:
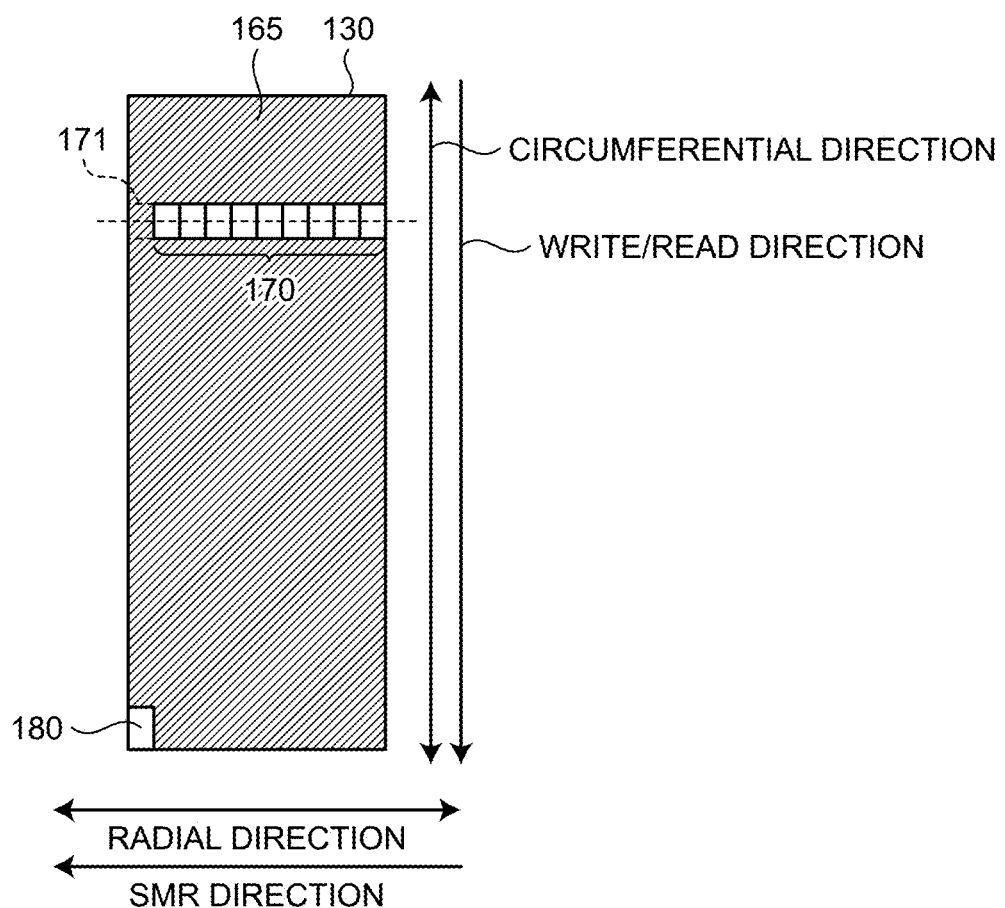
FIG. 15 is a view for describing an area to which an LBA is assigned by the magnetic disk apparatus of the second embodiment.

FIG. 15 is a view for describing an area to which an LBA is assigned by the magnetic disk apparatus 1 of the second embodiment. As illustrated in this drawing, the area 170 of a group including multiple sectors arrayed in the radial direction is determined to have low recording quality, and is thus not assigned with an LBA. However, an LBA is assigned to an area 171 of sectors included in the end track TR since the sectors included in the end track TR have relatively high recording quality.

According to the second embodiment, the quality inspection is inspection for multiple sectors included in at least one track TR of the multiple tracks TR provided on the magnetic disk 11 as described above. The SoC 30 of the magnetic disk apparatus 1 selects Nr sectors from the radially extending elongated area (hereinafter, partial area) including the sector having the lowest recording quality among the multiple sectors included in the inspection track TR.

The recording quality of the magnetic disk apparatus 1 as a whole can be improved based on results of quality inspection on some of all the sectors provided in the magnetic disk 11. All the sectors provided in the magnetic disk 11 are not set as targets of the quality inspection, so that the time required for the quality inspection can be shortened.

Note that, also in the second embodiment, the SoC 30 may select the Nr sectors having the lowest quality from all the sectors included in the tracks TR from the head track TR to the track TR adjacent to the end track TR out of the multiple tracks TR included in the band area 130.

With the configuration above, the sectors of the end track TR having good recording quality are used instead of the Nr sectors having the lowest recording quality among the group of sectors included in the band area 130. Therefore, the recording quality in the band area 130 is improved, and the recording quality of the magnetic disk apparatus 1 as a whole is improved.

According to the above-described first and second embodiments, the magnetic disk apparatus 1 can exhibit the following features. The number of sectors, which are included in the end track TR and not assigned with an LBA, is the same over the multiple band areas 130. According to the example illustrated in FIG. 9, a common number of spare sectors are provided for the band area 130a and the band area 130b. An LBA is assigned to each surplus sector other than the spare sectors out of surplus sectors included in the end track TR in each of the band areas 130a and 130b.

Therefore, the number of sectors which are included in the end track TR of the band area 130a and not assigned with an LBA is equal to the number of sectors which are included in the end track TR of the band area 130b and not assigned with an LBA.

In the examples described in the first embodiment and the second embodiment, out of the multiple storage areas 110 provided on the recording surface 100 of the magnetic disk 11, all storage areas 110 except the media cache area 120 are used as the band areas 130 to which data is written by the SMR. Techniques of the first embodiment and the second embodiment can also be applied to a magnetic disk apparatus in which the band area 130 to which data is written by the SMR and an area to which data is written by the CMR are mixed in multiple storage areas 110.

Moreover, the techniques of the first embodiment and the second embodiment can also be applied to a magnetic disk apparatus in which a recording scheme can be switched between the SMR and the CMR during the operation. In such a magnetic disk apparatus, when a band area where data is to be written by the SMR is set, an SoC executes the processing of S203 to S207 illustrated in FIG. 12 or the processing of S403 to S407 illustrated in FIG. 14 for the band area.

In addition, in the examples described in the first embodiment and the second embodiment, the inspection apparatus 3 executes quality inspection, and the SoC 30 of the magnetic disk apparatus 1 acquires a result of the quality inspection from the quality information 41 (see, for example, S205 in FIGS. 12 and S405 in FIG. 14). The SoC 30 may execute quality inspection and acquire a quality inspection result. For example, the SoC 30 may be configured to execute a series of operations illustrated in FIG. 11 or FIG. 13.

While some embodiments have been described, these embodiments have been presented by way of example only and are not intended to limit the scope of the inventions. Indeed, the novel embodiments described herein can be embodied in a variety of other forms; moreover, various omissions, substitutions and changes can be made without departing from the gist of the inventions. These embodiments or modifications thereof are included in the scope or the gist of the inventions and are included in the inventions described in the claims and an equivalent scope thereof.

What is claimed is:

1. A method comprising:
    acquiring a result of quality inspection related to recording quality of first multiple sectors included in a first storage area of a magnetic disk provided in a magnetic disk apparatus, the first storage area including first multiple tracks to which data is written by a shingled magnetic recording (SMR) scheme, the first multiple tracks each including different sectors out of the first multiple sectors;
    calculating a first number based on a set capacity of the first storage area and a set value of recording density of the first storage area, the first number being a number of sectors corresponding to a capacity obtained by subtracting the set capacity from an actual capacity of the first storage area;
    selecting, based on the result of quality inspection, a second number of sectors from among the first multiple sectors, the second number being a number larger than zero and equal to or smaller than the first number; and
    assigning addresses to a group of sectors not included in the second number of sectors among the first multiple sectors, the addresses being usable by a host connected to the magnetic disk apparatus, the group of sectors being sectors with a number corresponding to the set capacity.

2. The method according to claim 1, wherein
    the result of quality inspection is a result of quality inspection on all the first multiple sectors, and
    the selecting includes selecting the second number of sectors having lowest recording quality among the first multiple sectors.

3. The method according to claim 1, wherein
    the magnetic disk is provided with second multiple tracks including the first multiple tracks,
    the result of quality inspection is a result of quality inspection on second multiple sectors being sectors included in one of the second multiple tracks, and
    the selecting includes selecting the second number of sectors included in a partial area extending in a radial direction of the magnetic disk, the partial area including a sector having lowest recording quality among the second multiple sectors.

4. The method according to claim 1, wherein
    a direction in which data is written by the SMR scheme to the first multiple tracks is set to a direction from a first track of the first multiple tracks to a second track of the first multiple tracks, the first track being a track closest to one end of the first storage area in a radial direction, the second track being a track closest to another end of the first storage area in the radial direction, and
    the selecting is performed by selecting the second number of sectors from among third multiple sectors being a group of sectors included in third multiple tracks from the first track to a third track, the third track being a track adjacent to the second track among the first multiple tracks.

5. The method according to claim 2, wherein
    a direction in which data is written by the SMR scheme to the first multiple tracks is set to a direction from a first track of the first multiple tracks to a second track of the first multiple tracks, the first track being a track closest to one end of the first storage area in a radial direction, the second track being a track closest to another end of the first storage area in the radial direction, and
    the selecting is performed by selecting the second number of sectors from among third multiple sectors being a group of sectors included in third multiple tracks from the first track to a third track, the third track being a track adjacent to the second track among the first multiple tracks.

6. The method according to claim 3, wherein
    a direction in which data is written by the SMR scheme to the first multiple tracks is set to a direction from a first track of the first multiple tracks to a second track of the first multiple tracks, the first track being a track closest to one end of the first storage area in a radial direction, the second track being a track closest to another end of the first storage area in the radial direction, and
    the selecting is performed by selecting the second number of sectors from among third multiple sectors being a group of sectors included in third multiple tracks from the first track to a third track, the third track being a track adjacent to the second track among the first multiple tracks.

7. The method according to claim 1, further comprising acquiring the second number by subtracting a set number larger than zero from the first number.

8. The method according to claim 2, further comprising acquiring the second number by subtracting a set number larger than zero from the first number.

9. The method according to claim 3, further comprising acquiring the second number by subtracting a set number larger than zero from the first number.

10. The method according to claim 1, further comprising:
    setting multiple second storage areas arrayed in a radial direction of the magnetic disk, the multiple second storage areas each having a capacity larger than the set capacity; and
    selecting one of the multiple second storage areas,
    wherein the first storage area is the one of the multiple second storage areas.

11. The method according to claim 2, further comprising:
    setting multiple second storage areas arrayed in a radial direction of the magnetic disk, the multiple second storage areas each having a capacity larger than the set capacity; and
    selecting one of the multiple second storage areas,
    wherein the first storage area is the one of the multiple second storage areas.

12. The method according to claim 3, further comprising:
    setting multiple second storage areas arrayed in a radial direction of the magnetic disk, the multiple second storage areas each having a capacity larger than the set capacity; and
    selecting one of the multiple second storage areas,
    wherein the first storage area is the one of the multiple second storage areas.

13. The method according to claim 4, further comprising:
    setting multiple second storage areas arrayed in a radial direction of the magnetic disk, the multiple second storage areas each having a capacity larger than the set capacity; and
    selecting one of the multiple second storage areas,
    wherein the first storage area is the one of the multiple second storage areas.

14. The method according to claim 5, further comprising:
    setting multiple second storage areas arrayed in a radial direction of the magnetic disk, the multiple second storage areas each having a capacity larger than the set capacity; and
    selecting one of the multiple second storage areas,
    wherein the first storage area is the one of the multiple second storage areas.

15. The method according to claim 6, further comprising:
    setting multiple second storage areas arrayed in a radial direction of the magnetic disk, the multiple second storage areas each having a capacity larger than the set capacity; and
    selecting one of the multiple second storage areas,
    wherein the first storage area is the one of the multiple second storage areas.

16. The method according to claim 7, further comprising:
    setting multiple second storage areas arrayed in a radial direction of the magnetic disk, the multiple second storage areas each having a capacity larger than the set capacity; and
    selecting one of the multiple second storage areas,
    wherein the first storage area is the one of the multiple second storage areas.

17. The method according to claim 8, further comprising:
    setting multiple second storage areas arrayed in a radial direction of the magnetic disk, the multiple second storage areas each having a capacity larger than the set capacity; and
    selecting one of the multiple second storage areas,
    wherein the first storage area is the one of the multiple second storage areas.

18. The method according to claim 9, further comprising:
    setting multiple second storage areas arrayed in a radial direction of the magnetic disk, the multiple second storage areas each having a capacity larger than the set capacity; and
    selecting one of the multiple second storage areas,
    wherein the first storage area is the one of the multiple second storage areas.

19. A magnetic disk apparatus comprising:
    a magnetic disk on which a first storage area and a second storage area are provided, the first storage area including multiple second tracks out of multiple first tracks, the multiple first tracks each including multiple sectors, the second storage area including multiple third tracks different from the multiple second tracks out of the multiple first tracks;
    a magnetic head; and
    a controller configured to
        write data by an SMR scheme with the magnetic head to the multiple second tracks, and
        write data by the SMR scheme with the magnetic head to the multiple third tracks,
    wherein a number of sectors in a second track not assigned with addresses usable by a host is equal to a number of sectors in a third track not assigned with addresses usable by a host, the second track being a track to which data is finally written by a write operation on the multiple second tracks with the SMR scheme, the third track being a track to which data is finally written by a write operation on the multiple third tracks with the SMR scheme.

* * * * *